(12) United States Patent
Hofschulte et al.

(10) Patent No.: US 8,485,489 B2
(45) Date of Patent: Jul. 16, 2013

(54) LONGITUDINAL ADJUSTMENT MECHANISM FOR SEATS

(75) Inventors: Wolfram Hofschulte, Bonndorf (DE); Fred Krimmel, Albstadt (DE); Rolf-Dieter Lohner, Villingen-Schwenningen (DE)

(73) Assignee: IMS Gear GmbH, Eisenbach (DE)

( * ) Notice: Subject to any disclaimer, the term of this patent is extended or adjusted under 35 U.S.C. 154(b) by 1080 days.

(21) Appl. No.: 11/979,488

(22) Filed: Nov. 5, 2007

(65) Prior Publication Data

US 2008/0105810 A1    May 8, 2008

(30) Foreign Application Priority Data

Nov. 8, 2006   (DE) .......................... 10 2006 052 936

(51) Int. Cl.
*F16M 13/00* (2006.01)
(52) U.S. Cl.
USPC .............................. 248/424; 74/425; 248/429
(58) Field of Classification Search
USPC .................. 248/424, 429, 419, 420; 297/311, 297/312; 296/65.01, 65.13, 65.14; 74/89.23, 74/89.14, 724, 425
See application file for complete search history.

(56) References Cited

U.S. PATENT DOCUMENTS

| | | | |
|---|---|---|---|
| 5,048,786 A | 9/1991 | Tanaka et al. | |
| 6,220,642 B1* | 4/2001 | Ito et al. | 296/65.14 |
| 6,739,660 B2* | 5/2004 | Dukes | 297/256.13 |
| 7,051,986 B1 | 5/2006 | Taubmann | |
| 7,143,513 B2* | 12/2006 | Taubmann et al. | 29/893.1 |
| 7,340,974 B2* | 3/2008 | Landskron et al. | 74/425 |
| 7,566,086 B2* | 7/2009 | Gray et al. | 296/65.13 |
| 2004/0206878 A1* | 10/2004 | Borbe et al. | 248/424 |
| 2005/0269478 A1* | 12/2005 | Woehrle et al. | 248/430 |
| 2006/0249644 A1 | 11/2006 | Folliot et al. | |
| 2007/0096494 A1* | 5/2007 | Hofschulte et al. | 296/65.01 |
| 2007/0108360 A1* | 5/2007 | Ito et al. | 248/424 |
| 2010/0044542 A1* | 2/2010 | Koga | 248/429 |

FOREIGN PATENT DOCUMENTS

| | | |
|---|---|---|
| CN | 1 494 496 A | 5/2004 |
| DE | 36 40 197 A1 | 10/1987 |
| DE | 42 08 948 A1 | 9/1992 |
| DE | 198 15 283 A1 | 10/1999 |
| DE | 198 44 817 A1 | 4/2000 |

(Continued)

OTHER PUBLICATIONS

European Search Report No. 07018890.9 (Apr. 16, 2010), pp. 8.

*Primary Examiner* — Alfred J Wujciak
(74) *Attorney, Agent, or Firm* — Nath, Goldberg & Meyer; Jerald L. Meyer; Scott C. Langford

(57) ABSTRACT

A longitudinal adjustment mechanism is provided for a seat, with a spindle guide nut (12) that can move on a spindle (10), which can be driven by a worm gear (14) with bearing sleeves (15) on both sides, as well as with a multi-part casing (20, 30) that receives the worm gear (14) and the spindle (10). The casing (20, 30) consists of two casing sections (20, 30) made of plastic, which can be inserted into one another in the axial direction (X) of the spindle (10); each casing section (20, 30) has a plate (21, 31), from which bars (22, 23, 24; 33) jut out on one side and the casing sections (20, 30) are permanently joined to one another. The mechanism provides a compact transmission for longitudinal seat adjustment mechanisms that is easy to assemble.

29 Claims, 5 Drawing Sheets

FOREIGN PATENT DOCUMENTS

| | | |
|---|---|---|
| DE | 102 50 944 A1 | 8/2003 |
| DE | 103 58 586 A1 | 7/2005 |
| DE | 10 2006 011 717 A1 | 10/2006 |
| DE | 10 2006 011 718 A1 | 10/2006 |
| EP | 0 652 133 A1 | 5/1995 |
| FR | 2 872 747 | 1/2006 |
| GB | 318229 A | 7/1930 |
| GB | 2 226 238 A | 6/1990 |
| GB | 2 404 704 A | 2/2005 |
| WO | 95/16585 | 6/1995 |
| WO | 2005/053997 A1 | 6/2005 |

Figure 1:
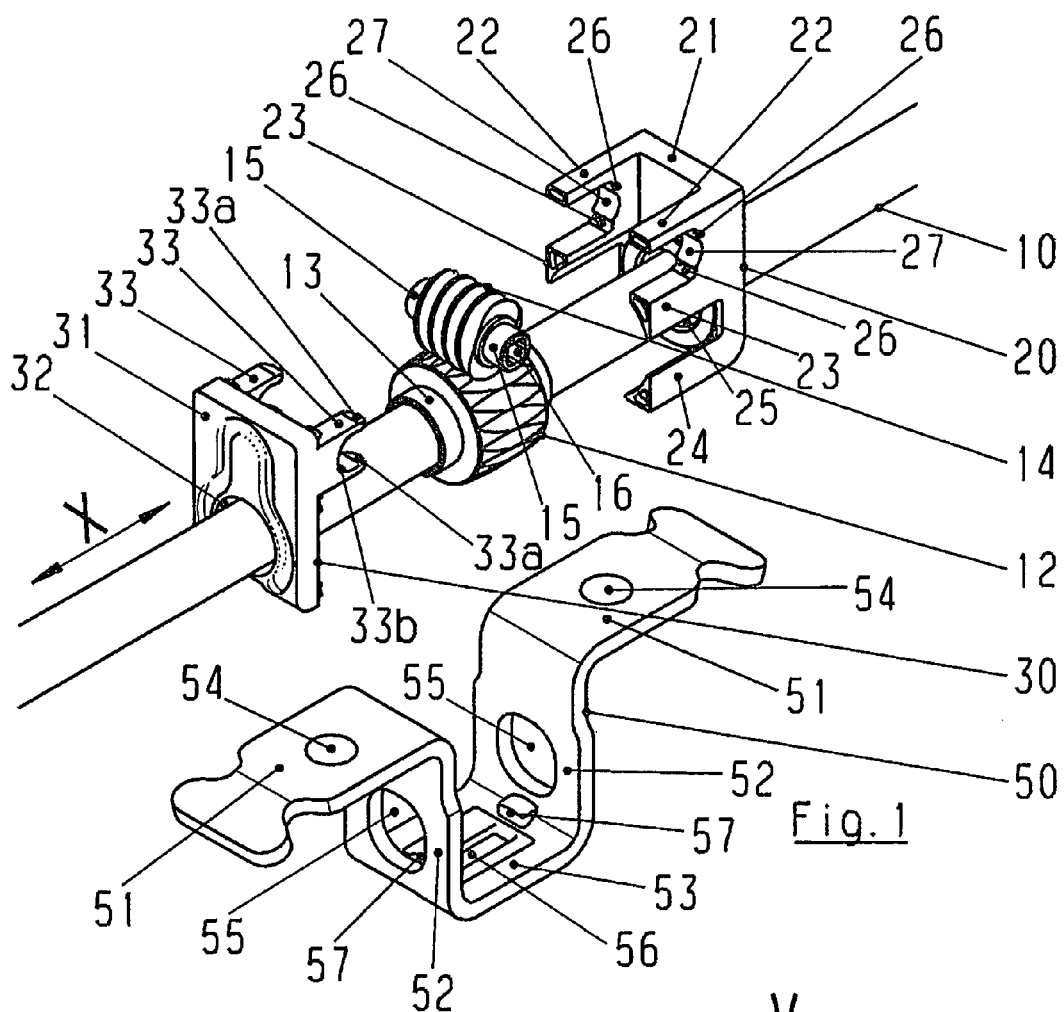

* cited by examiner ns for seats, particularly motor vehicle seats. FIG. 1 shows the
LONGITUDINAL ADJUSTMENT MECHANISM FOR SEATS The invention concerns a longitudinal adjustment mechanism for seats, with a spindle guide nut that can move on a spindle, which can be driven by a worm gear with a bearing sleeve on both sides, and with a multi-part casing that receives the worm gear and the spindle.

Such longitudinal adjustment mechanisms for seats have been rather well known in recent times. Longitudinal adjustment mechanisms for seats have a lower rail fixed onto a chassis, within which an upper rail, to which the seat is attached, is movable by means of a motor. In this arrangement, the upper rail holds a spindle fixed to the lower rail by its respective ends, on which a transmission that is rigidly coupled to the upper rail is located so that is can move axially. The seat, which is located on the two upper rails that are disposed parallel to one another, can be moved by means of a motor-driven apparatus.

Examples of devices for longitudinal seat adjustment are described in DE 36 40 197 A1, DE 42 08 948 C2, DE 196 42 655 C2, DE 198 15 283 A1, DE 198 44 817 A1, DE 199 44 690 A1 and WO 95/16 585.

It is the object of this invention to disclose a compact longitudinal adjustment mechanism for seats, requiring only a few components and which can be manufactured very easily.

This problem is solved by means of a longitudinal adjustment mechanism in which a multi-part gear casing has two casing sections made of plastic, which can be inserted into one another in the axial direction of the spindle, and each casing section has a plate, from which bars jut out on one side.

Improvements of the invention are the object of the subordinate claims.

Figure 2:
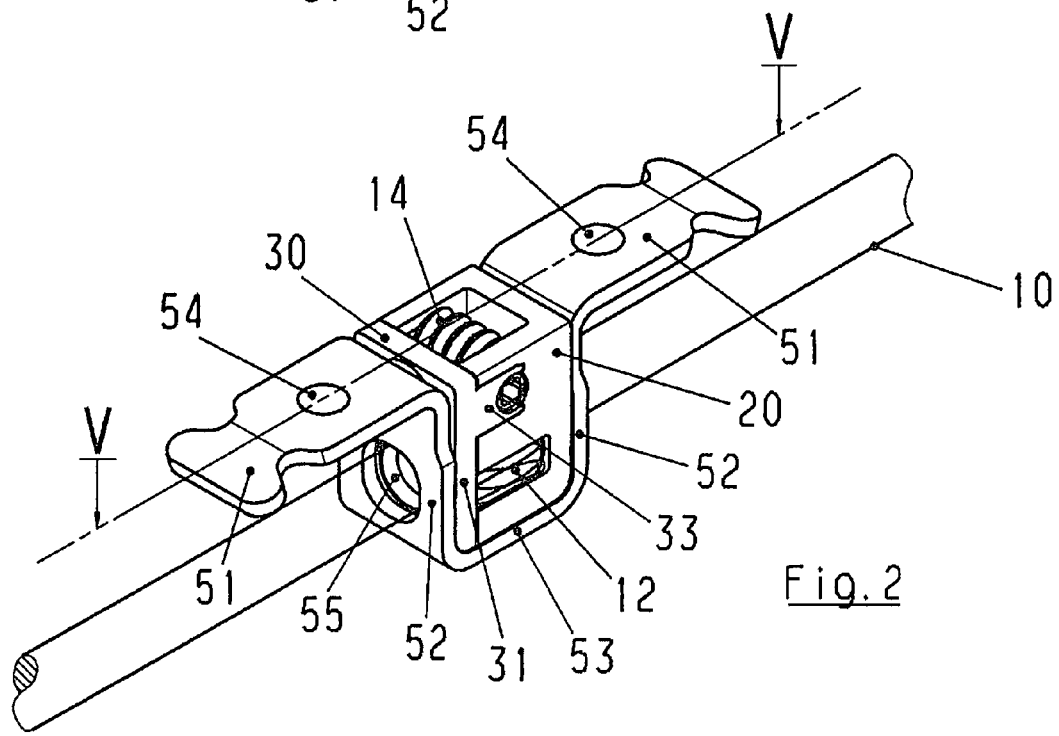
Figures 3, 4:
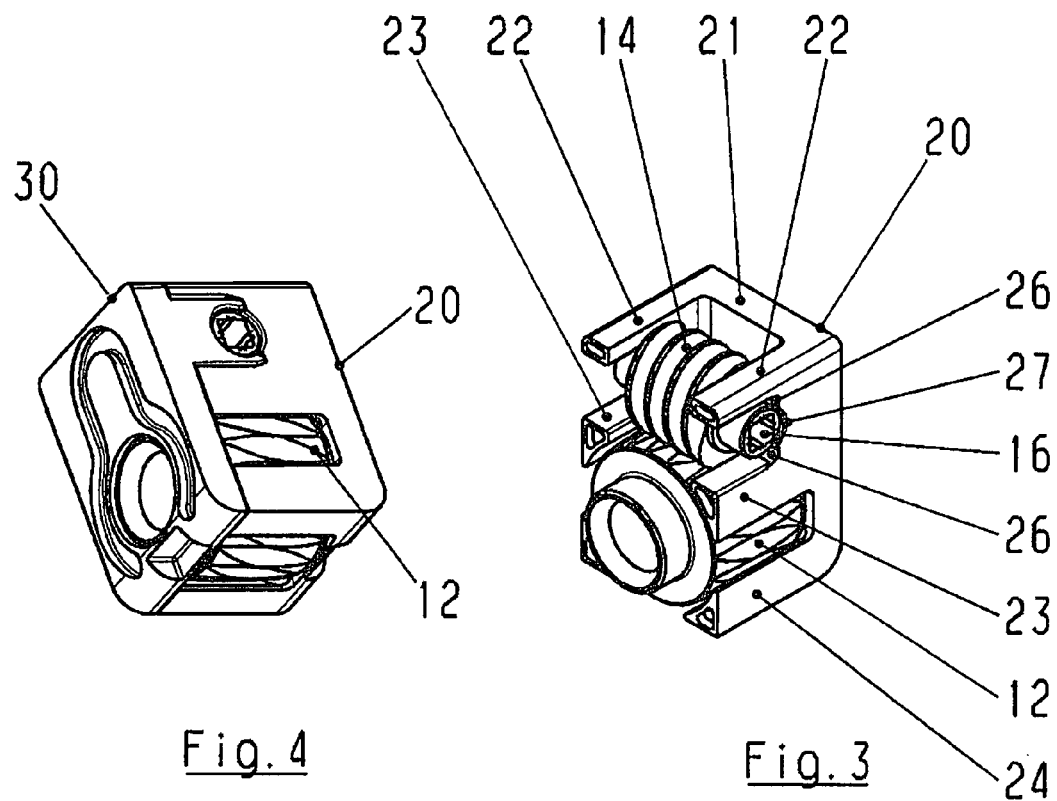

The invention is hereafter explained in greater detail based on an embodiment in conjunction with figures, which show:

FIG. 1 An exploded view of a longitudinal adjustment mechanism for seats according to the invention, FIG. 2 The longitudinal adjustment mechanism of FIG. 1 in the assembled condition, FIG. 3 A first casing section of the longitudinal adjustment mechanism of FIG. 1 or FIG. 2 with inserted spindle guide nut and worm gear, FIG. 4 The casing of the longitudinal adjustment mechanism according to FIG. 1 or FIG. 2 with both casing sections jointed to one another and the worm gear and spindle guide nut lying within.

Figure 5:
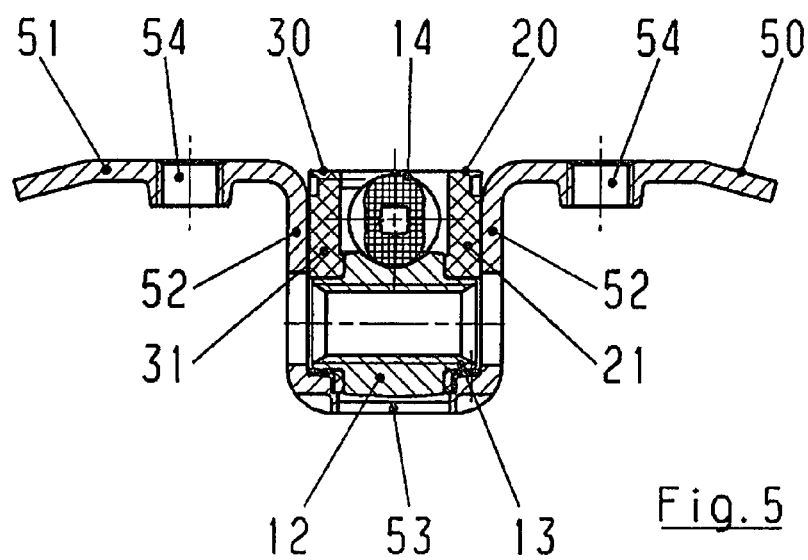
Figure 6:
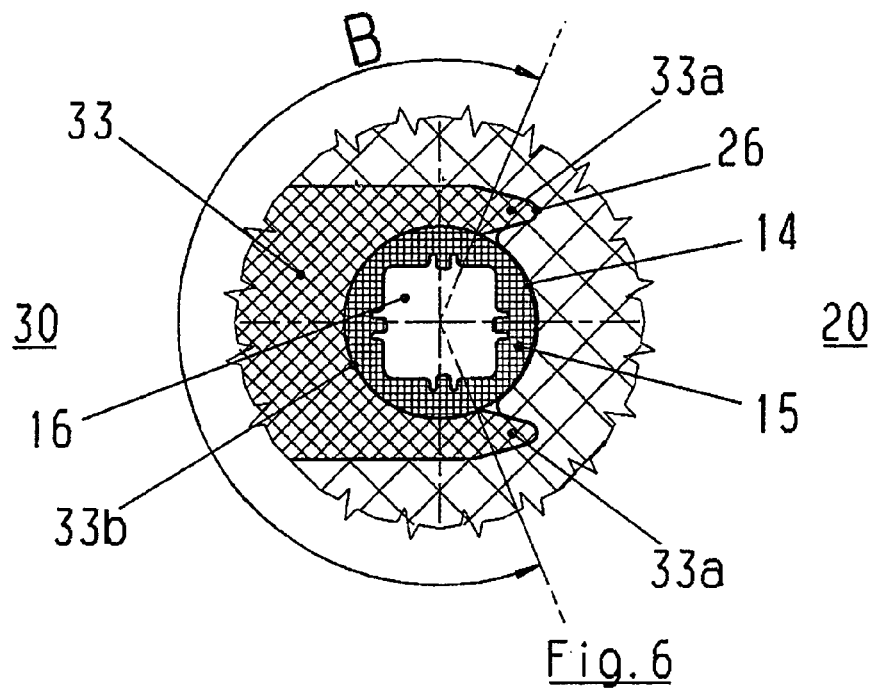
Figure 7:
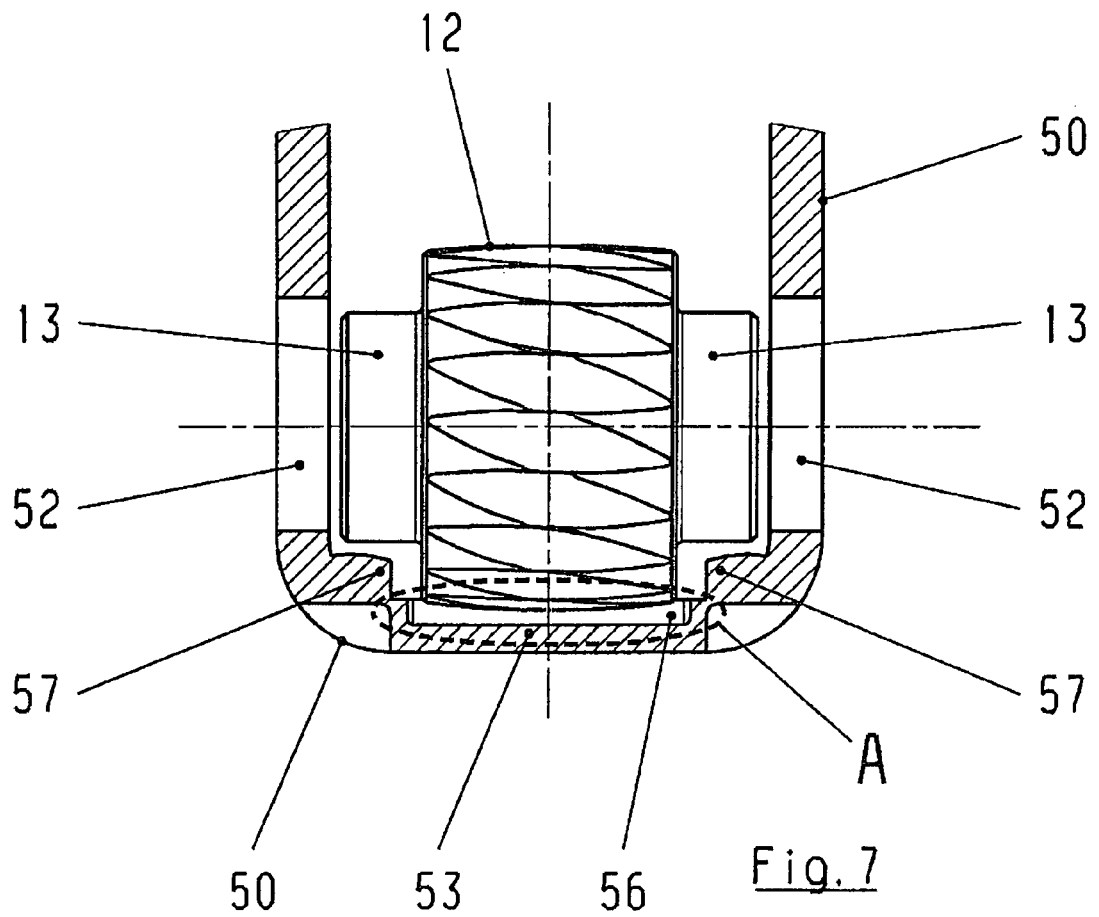
Figure 8:
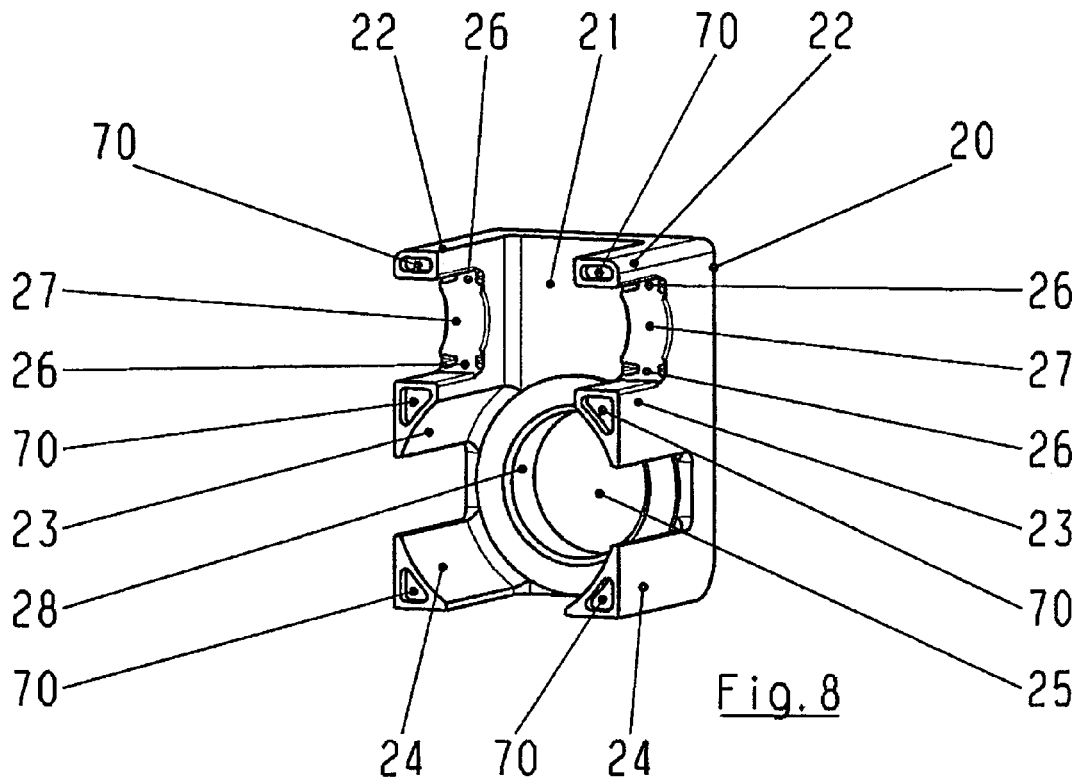
Figure 9:
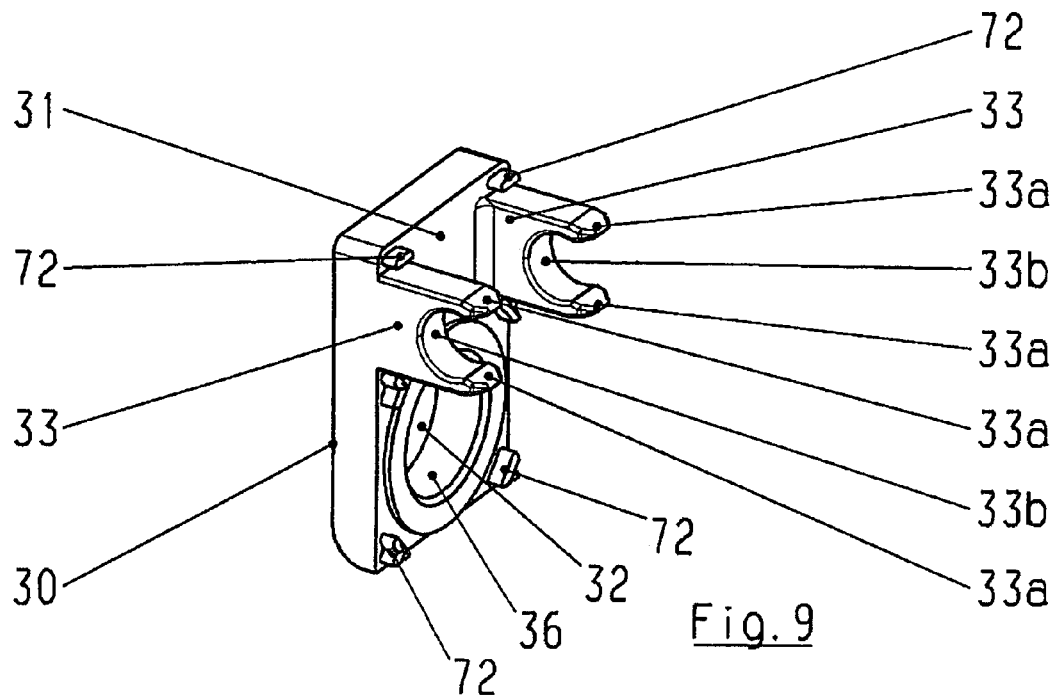
Figure 10:
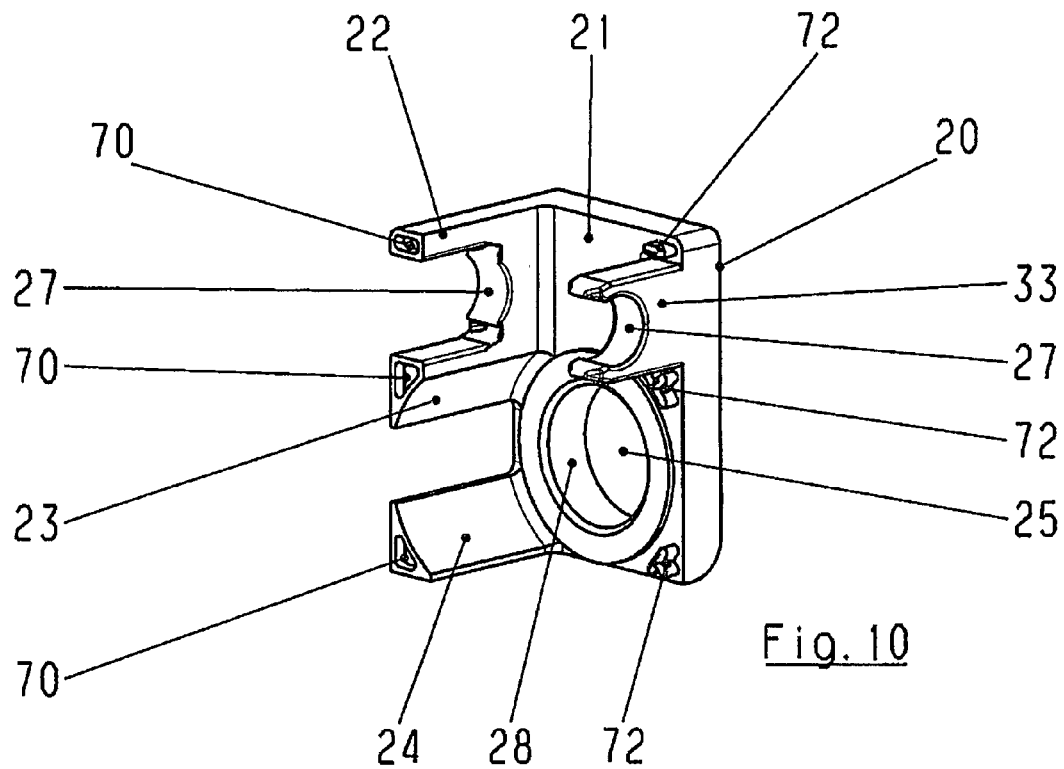
Figure 11:
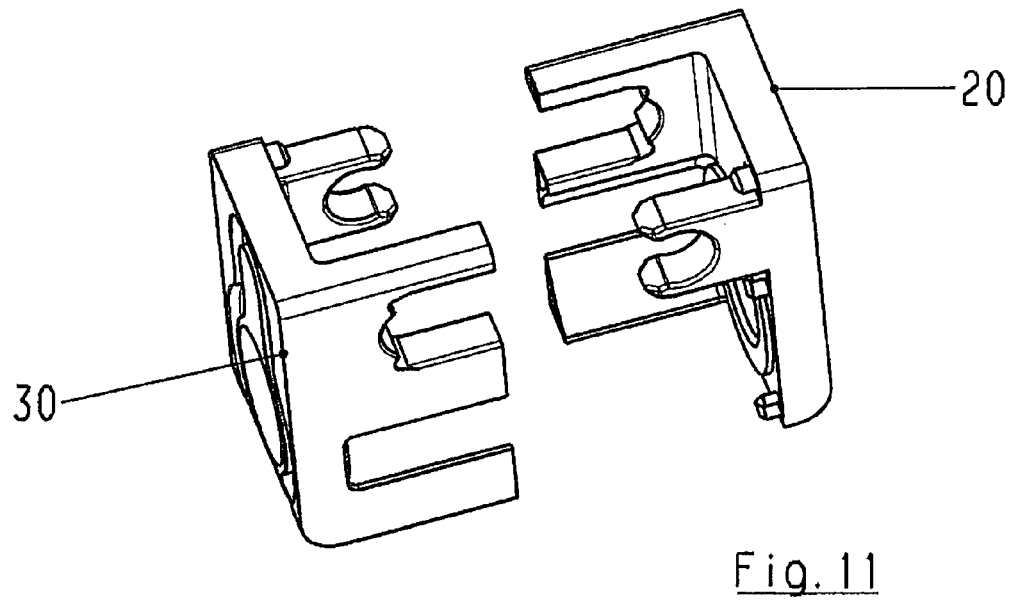

FIG. 5 A longitudinal cross-section through the longitudinal adjustment mechanism of FIG. 2 along the cut lines V-V, FIG. 6 A detail view of the bar shown in FIG. 1 of the second casing sections in the area where the worm gear is received, FIG. 7 A detail view of the sectional view of FIG. 5 in the area of the U-shaped retaining bracket with the support projections, FIG. 8 The first casing section according to FIG. 3 in separate, perspective view, FIG. 9 The second casing section according to FIG. 1 in a separate, perspective view, FIG. 10 Another example of a first half-casing in a separate, perspective view, and FIG. 11 Another example of a second half-housing in a separate, perspective view.

Unless indicated otherwise, the figures assign the reference numbers of the same parts with the same meaning.

FIGS. 1 and 2 show a longitudinal adjustment mechanism for seats, particularly motor vehicle seats. FIG. 1 shows the longitudinal adjustment mechanism in an exploded view and FIG. 2 in the assembled state.

The assembly exhibits a spindle 10, upon which a spindle guide nut 12 rests, which can be driven by a worm gear 14, by means of which the spindle guide nut 12 moves along the spindle 10. Both the spindle guide nut 12 and the worm gear 14 exhibit bearing sleeves for the bearings the spindle 10 and the worm gear 14 in a casing comprising two casing sections 20 and 30. The bearing sleeves of the spindle guide nut 12 are marked with reference numbers 13 and the bearing sleeves of the worm gear 14 with reference numbers 15. Both the spindle guide nut 12 and the worm gear 14 respectively have two such bearing sleeves 13, 15 on both of their distal ends, so as to be seated in casing sections 20, 30 of the casing.

Both casing sections 20, 30 are made of plastic. This is preferably an anti-friction modified plastic, particularly of silicone or Teflon (registered trademark). The two casing sections 20, 30 are shown enlarged in FIGS. 8 and 9 and are depicted in detail in perspective view. The casing section 20 (see also FIG. 8 in this regard) has a nearly rectangular plate 21, at the two upper corners of which upper bars 22 extend outward in the same direction, towards the observer of FIG. 8. About half-way up the plate 21, two middle bars 23 extend in the same direction. At the lower two corners of plate 21 of the casing section 20, an additional two lower bars 24 extend in the direction of the observer of FIG. 8. Openings 70 are incorporated into the respective front ends of the two upper bars 22, the two middle bars 23 and the two lower bars 24, to enable a tongue and groove joint. The corresponding protrusions or nibs 72 of the second casing section 30 are pushed into these openings 70. This permits exact and clean positioning of the two casing sections 20, 30.

There is an arc-shaped or circular opening 27 between the upper bar 22 and the lower bar 23 on the left and right side wall of the casing 20, such that this opening 27 having an arc-shaped or circular border continues at the border of the upper bar 22 or the border of the middle bar 23 in the direction of the plate 21 of the casing section 20 with a depressed end notch. In contrast to this, the recess between the middle bar 23 and the lower bar 24 is of nearly rectangular shape.

In addition, the casing section 20 has an opening 25 in the lower half of the plate 21. The spindle 10 of the longitudinal adjustment mechanism is inserted through this opening 25. The longitudinal adjustment mechanism of the bearing sleeve 13 of the spindle guide nut 12 rests on the circular rim 28 of this opening 25.

The second casing section 30 can be discerned particularly well in the perspective view of FIG. 9. The second casing section 30 also has a plate 31. This plate 31 has, in its lower half, an opening 32 with a circular rim 36, on which the other bearing sleeve 13 of the spindle guide nut 12 can rest. In the upper half of the plate 31 of the second casing section 30, two bars 33 extend outward from the edge of the plate 31 in the same direction. A circular recess 33b is incorporated into the bars 33 on the ends of the two bars 33 facing away from the plate 31 of the casing section 30. This circular recess 33b forms a complete circle with preferably the same radius together with the arc-shaped or circular recess 27 of the first casing section 20. The ends formed by the incorporation of the circular recess 33b into the bars 33 are shaped and tapered as end wedges 33a. These end wedges 33a are provided for insertion into end wedge openings 26 of the first casing section 20. In addition, the second casing section 30 comprises the aforesaid nibs or protrusions 72, which engage the recesses or grooves 70 of the first casing section 20. The nibs or protrusions 72 are provided on the respective ends of the plate 31 for this purpose. Two additional protrusions or nibs 72 are positioned halfway up on the edge of the plate 31.

The thusly configured first and second casing sections 20, 30 can thus be easily inserted into one another by means of the tongue and groove joints with the grooves 70 on the first casing section 20 and the nibs 72 on the second casing section 30. Through the insertion into one another by means of said tongue and groove joints, the two casing halves 20, 30 are very precisely centered, in particular, in two spatial directions. The two casing sections 20, 30 are permanently joined to one another, for example, by means of ultrasonic welding, laser welding or gluing. It is quite possible to join the two casing sections to one another through a clamp joint or a snap-in connection. This can also result in making it extremely difficult to separate the two casing sections from one another, possibly only through the destruction of the two casing sections 20, 30.

FIG. 3 shows the first casing section 20 with the spindle guide nut 12 and the worm gear 14 inserted. In FIG. 4, the second casing section 30 is inserted into the first casing section 20, in which the spindle guide nut 12 and the worm gear 14 are already positioned.

In FIG. 6, an enlarged section of the region of the two casing sections 20, 30 is shown in a cross-sectional drawing, where the worm gear 14 lies with its bearing sleeve 15. The bar 33 of the two casing sections 30 with its circular recess 33b is clearly identifiable, as are the distal end wedges 33a tapering to a knife edge. These end wedges 33a of the two casing sections 30 lie in end wedge openings 26 of the first casing section 20. The arc-shaped or circular wall 27 of the first casing section 20 is discernable between the two end wedge openings 26. The radius of the circular recess 33b and the circular opening 27 is the same and corresponds roughly to the radius of the bearing sleeve 15 of the worm gear 14. As is particularly discernable from FIG. 6, the circular recess 33b encompasses the bearing sleeve 15 of the worm gear 14 by more than 180°, over an angle B. The angle in FIG. 6 is approximately 220°. Correspondingly, the angle with which arc-shaped opening 27 encompasses the bearing sleeve 15 of the worm gear 14 is clearly smaller, here approximately 100°. Such a wrap-around angle of the circular recess 33b, greater than 180°, has the advantage that the worm gear 14 can be securely pre-assembled into the half casing 30.

As shown in FIG. 6, the worm gear comprises a continuous square opening, such that the entire longitudinal adjustment mechanism can be driven by both sides of the worm gear.

The casing sections 20, 30 mated according to FIG. 4, with the spindle guide nut 12 and the worm gear 14 inserted therein, are inserted into a U-shaped retaining bracket 50 according to FIGS. 1 and FIG. 2. The retaining bracket 50 is bent into a U-shape from a punched metal strip and comprises two upper, horizontal legs 51 each of which borders on a vertical U-leg 52 is connected, while these two vertical U-legs 52 are connected to each other by a lower horizontal U-leg 53. The two upper horizontal legs 51 respectively have a mounting hole 54. The longitudinal adjustment mechanism can be attached to the underside of a seat through these mounting holes 54. Openings 55 for operating the spindle 10 are incorporated into the two vertical U-legs 52. The lower horizontal U-leg 53 has an opening 56 through which the spindle guide nut 12 can protrude, such that an overall small installation space or a small overall height of the entire assembly is obtained. Instead of an opening or a cavity 56, the lower horizontal U-leg 53 can only have a recess, which reduces the wall thickness of the lower horizontal U-leg 53. This also enables the spindle guide nut 12 to extend somewhat into the horizontal U-leg 53.

It is particularly advantageous, if spindle guide nut 12 exhibits a convex external contour. In addition, the retaining bracket 50 comprises support projections 57, which lie roughly in the middle of retaining bracket 50 at the transition between vertical U-leg 52 and horizontal U-leg 53. These support projections 57 serve to effectively support the front edge of the spindle guide nut 12. In the event of a crash, these support projections 57 prevent the spindle guide nut 12 from moving in the direction of the spindle axis 10. This improves safety in a crash. Aside from separate support projections 57, such support projections can also be designed so that the corresponding embossings are incorporated into the material of the retaining bracket 50. The introduction of such support projections 57 or embossings into the transition area between the vertical legs 52 and the lower horizontal leg 53, moreover results in clearly improved flexural strength of the entire retaining bracket 50.

FIG. 2 shows the retaining bracket 50 with the inserted casing sections 20, 30, as well as the worm gear 14 and the spindle guide nut 12. FIG. 5 is the corresponding cross-sectional view along the cutting plane V-V of FIG. 2

FIG. 7 shows the convex spindle guide nut 12 inserted into the retaining bracket 50 with its bearing sleeves 13. The casing sections 20, 30 are omitted in FIG. 7 for better clarity. Support projections 57 provided at the transitions of the vertical U-legs 52 to the horizontal U-leg 53 are clearly visible. It is also apparent, how the convex outer contour 12 of the spindle guide nut 12 extends with an extending region A into the cavity 56 of the lower horizontal U-leg 53.

The convex configuration of the spindle guide nut 12 or the convex configuration of the worm gear teeth leads to a shorter overall length of the spindle guide nut 12, which likewise helps to reduce the overall installed size of the longitudinal adjustment mechanism.

Due to the direct seating of the bearing sleeves 15 of the worm gear 14 and respectively of the bearing sleeves 13 of spindle guide nut 12, in the in rims 36 of the opening 32 of the second casing section 30 and respectively the rim 28 of opening 25 of the first casing section 20 as well as in the circular openings 33b and 27, the worm gear 14 and the spindle guide nut 12 are supported directly and straightforwardly. By this means, additional bearing components, such as discs and bushings can be omitted. The result is a reduced number of components required for the longitudinal adjustment mechanism.

Although the casing sections 20, 30 were explained in connection with FIGS. 1 to 9, which appear to be different, the scope of the present invention calls for two casing sections 20, 30 to be provided, which are of identical design. FIGS. 10 and 11 depict such casing sections of identical design. The particular advantage of such casing sections of identical design is that only a single injection molding die is required to produce both casing sections 20, 30.

The casing section 20 shown in FIG. 10 differs from the previously shown first casing section 20, in that the aforesaid upper bar 22, the middle bar 23 and the lower bar 24 are only located on the left edge of the plate 21 (see FIG. 10 in this regard). On the right edge of the plate 21 there is, conversely, a bar, which corresponds to the corresponding bar 33 shown in relation with the second casing section 30. Likewise, on the right edge of the plate 21, there are the nibs 72 or protrusions as explained in connection with the second casing section 30.

FIG. 11 depicts two such identical casing sections 20, 30, to form an assembly in which one of these casing sections must be turned around by only 180° so as to mate them.

As a whole, the longitudinal adjustment mechanism of this invention is characterized by a very small, compact design. Moreover a spindle 10 with a diameter greater than or equal to 8 mm can be installed, which was heretofore impossible.

This is in particular due to the fact that the spindle guide nut 12 and the worm gear 14 are held in the casing without separate bearing components.

REFERENCE LIST

10 Spindle
12 Spindle guide nut
13 Spindle guide nut bearing sleeve
14 Worm gear
15 Worm gear bearing sleeve
16 Square opening
20 First casing section
21 Plate
22 Upper bar
23 Middle bar
24 Lower bar
25 Opening
26 End wedge opening
27 Circular opening
28 Circular edge
30 Second casing section
31 Plate
32 Opening
33 Bar
33a End wedge
33b Circular recess
36 Circular rim
50 Retaining bracket
51 Horizontal leg
52 Vertical U-leg
53 Horizontal U-leg
54 Mounting hole
55 Opening for spindle
56 Cavity for spindle guide nut
57 Support projections
70 Grooves
72 Nibs
A Extended area
B Angle
X Axial direction of the spindle
V-V Cut line

The invention claimed is:

1. A longitudinal adjustment mechanism supporting a seat, with a spindle guide nut that can move on a spindle, which can be driven by a worm gear with a bearing sleeve on each end of the worm gear, and with a multi-part casing that receives the worm gear and the spindle, characterized in that the multi-part casing has two casing sections made of plastic, which can be inserted into one another in the axial direction of the spindle, each casing section has a plate, from which bars protrude from a location on the plate on either side of said spindle, where the bars protrude in a direction toward the worm gear and parallel to the spindle, at least one of the casing sections comprise a bar arrangement comprising at least one bar having a u-shaped configuration that juts out to encompass one of the bearing sleeves of the worm gear by more than 180°, and the bar encompassing at least one bearing sleeve of the worm gear has an arch-shaped recess, the arch-shaped recess extends greater than 180° forming a circular opening, where the arch-shaped recess is situated between two end wedge openings, such that each end of the arch-shaped recess conclude as end wedge openings.

2. Longitudinal adjustment mechanism according to claim 1, characterized in that the casing sections are permanently joined to one another.

3. Longitudinal adjustment mechanism according to claim 1, characterized in that the casing with the two casing sections and the worm gear sand spindle located therein resides in a U-shaped retaining bracket.

4. Longitudinal adjustment mechanism according to claim 3, characterized in that the U-shaped retaining bracket has an opening or at least an embossing or a depression for the spindle guide nut in its horizontal U-leg.

5. Longitudinal adjustment mechanism according to claim 1, characterized in that the spindle guide nut has a convex outer contour.

6. Longitudinal adjustment mechanism according to claim 1, characterized in that the spindle guide nut has bearing sleeves, which are inserted into openings of the plates of the two casing sections.

7. Longitudinal adjustment mechanism according to claim 1, characterized in that the spindle guide nut is seated in the openings of the two casing sections without the use of additional components.

8. Longitudinal adjustment mechanism according to claim 1, characterized in that the worm gear is seated in the two casing sections without the use of additional components.

9. Longitudinal adjustment mechanism according to claim 1, characterized in that the two casing sections are of identical design.

10. Longitudinal adjustment mechanism according to claim 1, characterized in that the two casing sections are inserted into one another so that they are held together by tongue and groove joints.

11. Longitudinal adjustment mechanism according to claim 1, characterized in that the spindle has a diameter greater than or equal to 8 mm.

12. Longitudinal adjustment mechanism according to claim 1, characterized in that the two casing sections are made of an anti-friction modified plastic, particularly of silicone or Teflon (registered trademark).

13. Longitudinal adjustment mechanism according to claim 1, wherein the seat is a motor vehicle seat.

14. A longitudinal adjustment mechanism supporting a seat, with a spindle guide nut that can move on a spindle, which can be driven by a worm gear with a bearing sleeve on each end of the worm gear, and with a multi-part casing that receives the worm gear and the spindle, characterized in that:

the multi-part casing has two casing sections made of plastic, which can be inserted into one another in the axial direction of the spindle, each casing section has a plate, from which bars protrude from a location on the plate on either side of said spindle, where the bars protrude in a direction toward the worm gear and parallel to the spindle, at least one of the casing sections comprise a bar arrangement comprising at least one bar that juts out to encompass one of the bearing sleeves of the worm gear by more than 180°, the bar encompassing at least one bearing sleeve of the worm gear has an arch-shaped recess, the arch-shaped recess extends greater than 180° forming a circular opening, where the arch-shaped recess is situated between two end wedge openings, such that each end of the arch-shaped recess concludes as end wedge openings, and bars of a casing section engage the corresponding end wedge openings and circular openings of the other casing section (20).

15. Longitudinal adjustment mechanism according to claim 1, characterized in that the two casing sections are joined to one another by ultrasonic welding or laser welding.

16. Longitudinal adjustment mechanism according to claim 1, characterized in that the two casing sections are joined to one another by means of a clamp joint or a snap-on connection.

17. Longitudinal adjustment mechanism according to claim 1, characterized in that the two casing sections are joined to one another by gluing.

18. Longitudinal adjustment mechanism according to claim 14, wherein the seat is a motor vehicle seat.

19. A longitudinal adjustment mechanism supporting a seat, with a spindle guide nut that can move on a spindle, which can be driven by a worm gear with a bearing sleeve on each end of the worm gear, and with a multi-part casing that receives the worm gear and the spindle, characterized in that:

the multi-part casing has two casing sections made of plastic, which can be inserted into one another in the axial direction of the spindle, each casing section has a plate, from which bars protrude from a location on the plate on either side of said spindle, where the bars protrude in a direction toward the worm gear and parallel to the spindle, the bar encompassing at least one bearing sleeve of the worm gear has an arch-shaped recess, the arch-shaped recess extends greater than 180 forming a circular opening, where the arch-shaped recess is situated between two end wedge openings, such that each end of the arch-shaped recess conclude as end wedge openings, the spindle guide nut has a convex outer contour, the convex spindle guide nut protrudes into an opening or a cavity of a U-shaped retaining bracket, the bracket comprising horizontal leg and vertical legs, wherein the horizontal is perpendicular at the bottom of the vertical legs forming the U-shaped bracket and the spindle guide nut is located in between the two vertical legs and the horizontal leg, and a support projection located in the transition area between the horizontal U-leg and vertical legs of the U-shaped retaining bracket, such that support projections are situated in both transition areas.

20. Longitudinal adjustment mechanism according to claim 19, characterized in that the spindle guide nut has bearing sleeves, which are inserted into openings of the plates of the two casing sections.

21. Longitudinal adjustment mechanism according to claim 19, characterized in that the two casing sections are of identical design.

22. Longitudinal adjustment mechanism according to claim 19, characterized in that the two casing sections are inserted into one another so that they are held together by tongue and groove joints.

23. Longitudinal adjustment mechanism according to claim 19, wherein the seat is a motor vehicle seat.

24. A longitudinal adjustment mechanism supporting a seat, with a spindle guide nut that, can move on a spindle, which can be driven by a worm gear with a bearing sleeve on each end of the worm gear, and with a multi-part casing that receives the worm gear and the spindle, characterized in that:

the multi-part casing has two casing sections made of plastic, which can be inserted into one another in the axial direction of the spindle, each casing section has a plate, from which bars protrude from a location on the plate on either side of said spindle, where the bars protrude in a direction toward the worm gear and parallel to the spindle, the bar encompassing at least one bearing sleeve of the worm gear has an arch-shaped recess, the arch-shaped recess extends greater than 180 forming a circular opening, where the arch-shaped recess is situated between two end wedge openings, such that each end of the arch-shaped recess conclude as end wedge openings, the casing with the two casing sections and the worm gear and spindle located therein resides in a U-shaped retaining bracket, wherein said bracket comprising horizontal leg and vertical legs, wherein the horizontal is perpendicular at the bottom of the vertical legs forming the U-shaped bracket and the spindle guide nut is located in between the two vertical legs and the horizontal leg, the U-shaped retaining bracket has a support projection located on either side of the spindle guide nut, on which the spindle guide nut can be supported on its front side, and the support projections are located in the transition area between the horizontal U-leg and vertical legs of the U-shaped retaining bracket.

25. Longitudinal adjustment mechanism according to claim 24, characterized in that the support projections point to the inside of the U-shaped retaining bracket and are formed by bending or roll pressing the U-shaped retaining bracket.

26. Longitudinal adjustment mechanism according to claim 24, characterized in that the spindle guide nut has bearing sleeves, which are inserted into openings of the plates of the two casing sections.

27. Longitudinal adjustment mechanism according to claim 24, characterized in that the two casing sections are of identical design.

28. Longitudinal adjustment mechanism according to claim 24, characterized in that the two casing sections are inserted into one another so that they are held together by tongue and groove joints.

29. Longitudinal adjustment mechanism according to claim 24, wherein the seat is a motor vehicle seat.

* * * * *